Figure 1:
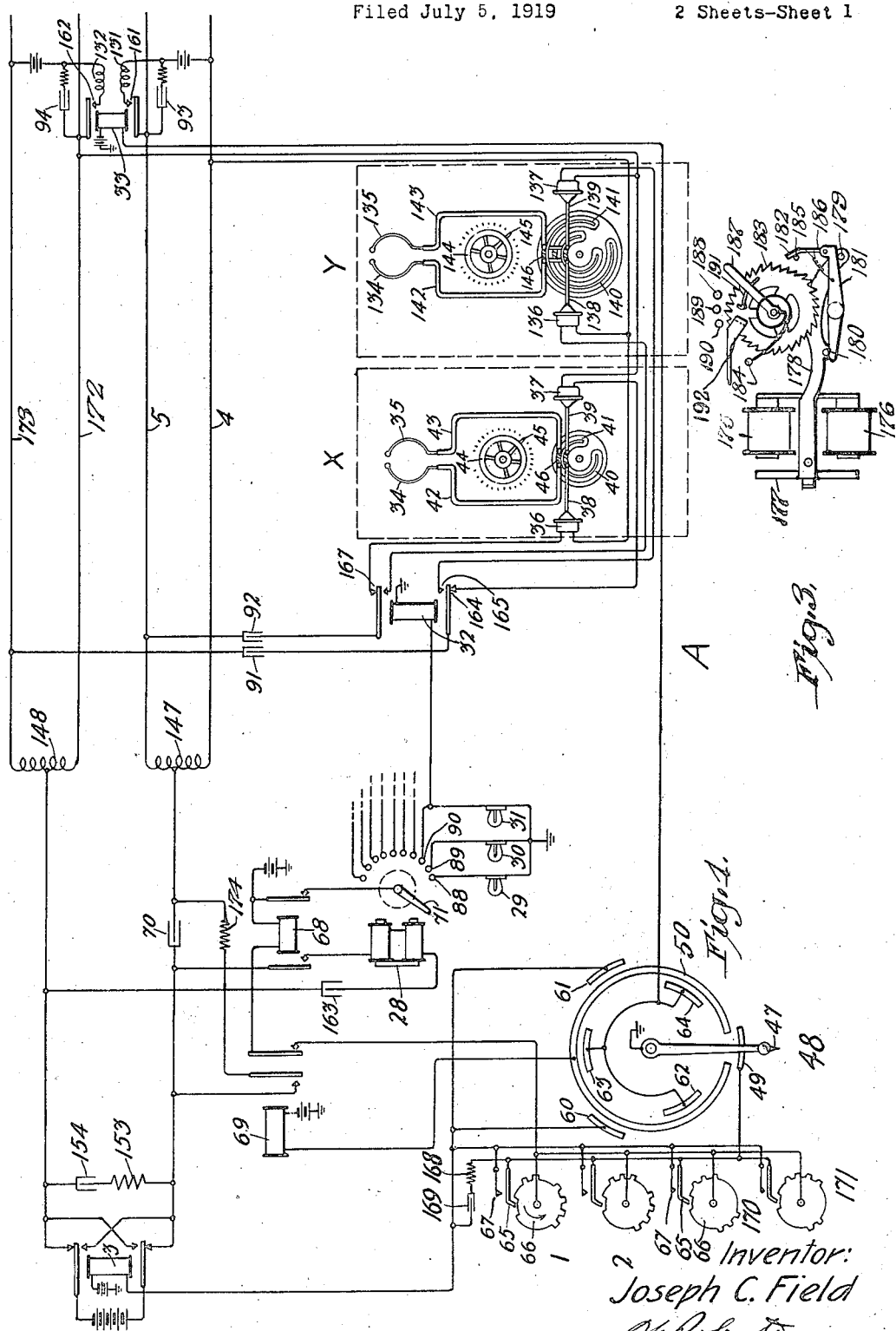

May 1, 1924.

1,499,766

UNITED STATES PATENT OFFICE.

JOSEPH C. FIELD, OF ORANGE, NEW JERSEY, ASSIGNOR TO WESTERN ELECTRIC COMPANY, INCORPORATED, OF NEW YORK, N. Y., A CORPORATION OF NEW YORK.

SWITCHING SYSTEM.

Application filed July 5, 1919. Serial No. 308,759.

*To all whom it may concern:*

Be it known that I, JOSEPH C. FIELD, a citizen of the United States, residing at 432 Central Avenue, Orange, in the county of Essex, State of New Jersey, have invented certain new and useful Improvements in Switching Systems, of which the following is a full, clear, concise, and exact description.

This invention relates to switching systems and particularly to those employed in systems for detecting the presence of submarine or other marine vessels.

In systems of this character, in which it is desired to selectively observe individually or binaurally in pairs, the operation of fixedly positioned groups of submerged detectors responsive to mechanical vibrations propagated through the water from a submarine or other source, it is desirable to provide means for not only readily and quickly selecting such groups but also to select the individual or paired detectors within the groups for observation. Particularly in the binaural method of determining the location of a rapidly moving source of vibration by means of a system in which three or more detectors at each station are connected in different pairs to separate transmission lines leading to the binaural receivers at the observing station, it is necessary that the shifting between the pairs of detectors within a group be accomplished as rapidly as may be possible. It is also often desirable to rapidly repeat the observation of certain pairs of detectors composing the group at a selected station.

In some systems of this character it is desirable to binaurally observe the operation of differently spaced pairs of detectors. Since the design of the acoustic compensator often employed in such observation depends upon the spacing of the paired detectors, it is desirable to provide means insuring the use of the proper compensator in each case.

In order to reduce the deleterious cohering or packing effects upon the microphonic device which may be associated with the detector for varying the response of the electrical circuit, which effects are caused by sparking and similar electrical disturbances incident to the sudden application and removal of current, such circuit-interrupting points are shunted by capacitance for absorbing these changes.

It is one object of the invention to provide a switching system of this nature in which the station selector is not released from a predetermined position during the selection or reselection of the detector pairs or other responsive devices thereat.

It is a further object of the invention to provide in a system of this nature employing differently spaced pairs of detectors, automatic switching means whereby the use of a proper acoustical compensator for a selected pair is insured.

Another object of the invention resides in the provision of means insuring that the microphonic detecting device is connected to and disconnected from the operating circuit only during periods when the electrical conditions of the circuit are stabilized.

To attain these objects in accordance with a feature of the invention, electromechanical switching devices at the various detecting stations capable of individual selection by alternating current impulses transmitted from the observer's station are retained mechanically upon selection, the detector pairs thereat being selectively connected to the transmission lines leading to the binaural receivers at the observer's station by the transmission of additional reserved current impulses from the observer's station. The selected switching device is maintained in its more advanced positions by virtue of direct current flowing through its winding, and upon the cessation of such current it returns to its mechanically held selected position, thus permitting the reselection of the pairs of the associated detectors without releasing the station selecting means.

In accordance with another feature of the invention, the association of the binaural receivers and the associated compensator with the transmission lines is controlled by the master switching device operating in synchronism with the individual switching devices, the proper compensator being associated with the listening lines as determined by the selected detectors.

A further feature resides in the provision of switching means insuring the absence of current supply from the operating circuits of the current varying devices of the detectors at the time such detectors are associated with or disassociated from the circuits.

Figure 2:
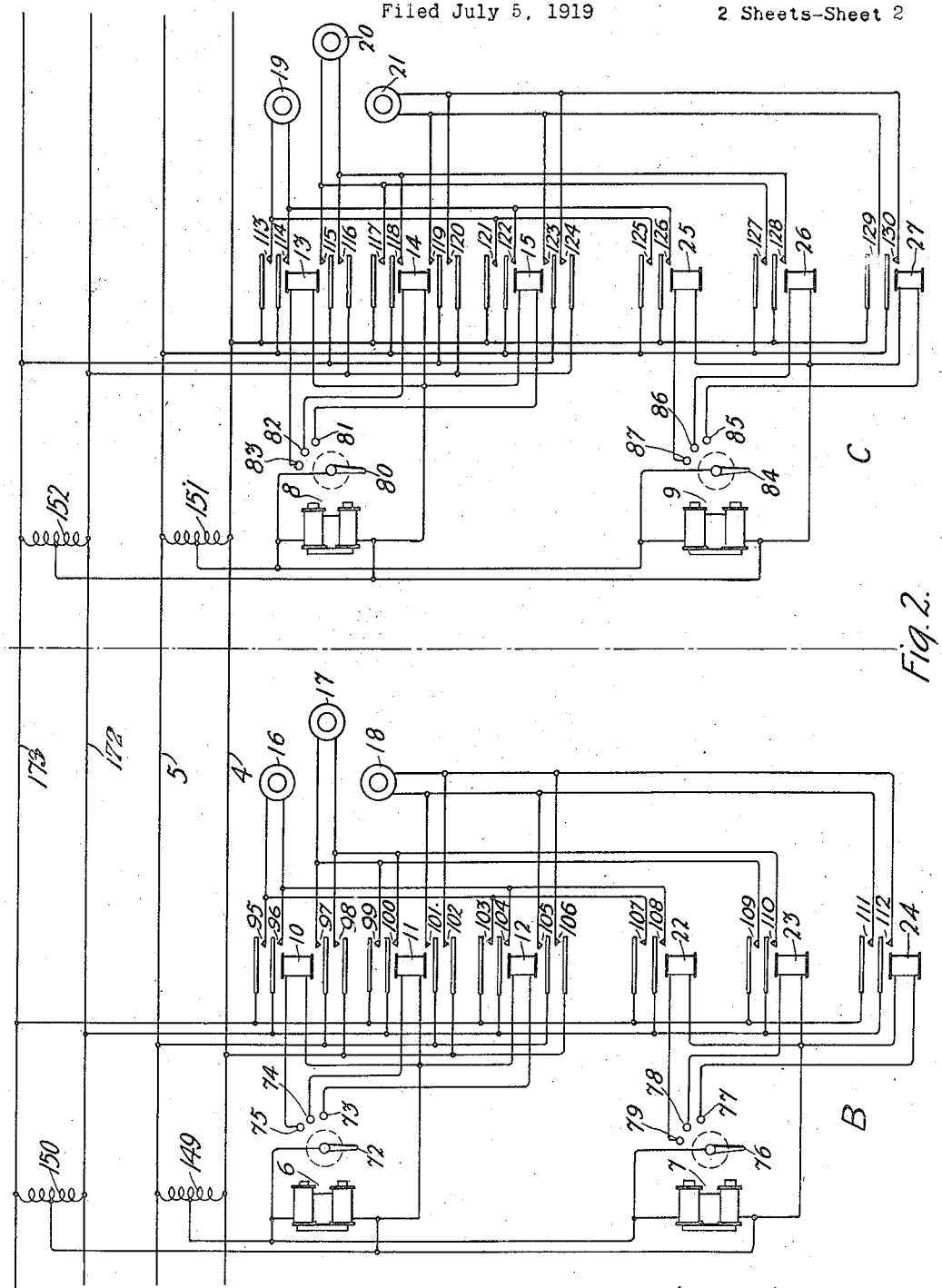

These and other features not specifically mentioned above will clearly appear from the following specification and the annexed drawing, Figs. 1 and 2 of which, when placed end to end with Fig. 1 at the left, show one embodiment of the invention as applied to a multiple station submarine detection system, while Fig. 3 shows more in detail the type of selector employed.

Referring to the drawing, at an observer's station A there is provided a reversing relay 3, controlled by a plurality of multiply connected sending devices 1, 2, 170 and 171, and a switch 48 for impressing reversed current impulses upon a phantom circuit composed of physical pairs of conductors 4—5 and 172—173 and simplexing coils 147 to 152 inclusive and extending to the other stations of the system. Serially interconnected resistance 153 and condenser 154 are bridged across the phantom circuit for the well known purpose of eliminating sparks produced by the opening and closing of the contacts of relay 3, while resistance 168 and condenser 169 shunt the contacts of the sending devices for a similar purpose. Associated with the phantom circuit at the stations B and C and controlled by the sending devices and the switch 48, selectors 6 and 8 are provided to selectively associate switching relays 10, 11, 12 and 13, 14, 15 respectively, with the phantom circuit controlling the association of the detectors 16, 17, 18 and 19, 20, 21 in the desired pair arrangements with the pairs of conductors 4—5 and 172—173. Selectors 7 and 9, provided at stations B and C respectively, are similar and also controlled by the sending devices and the associated switch, selectively associate switching relays 22, 23, 24 and 25, 26, 27 with the phantom circuit to control the individual association of the detectors 16, 17 and 18 with the physical pairs of conductors 4—5 and 172—173 in paired arrangement with corresponding ones of detectors 19, 20 and 21. Although the selectors 6, 7, 8 and 9 may be of any suitable step-by-step type adapted to be advanced to a certain point upon the receipt of a predetermined series of closely succeeding impulses of current from the observer's station, the type disclosed in my Patent No. 1,343,256 dated June 15, 1920, is preferable. The detectors 16 to 21 inclusive may be of any suitable type responsive to mechanical vibrations propagated through the water to cause variations in electrical conditions of an associated circuit, and may be suitably mounted in a triangular arrangement upon a fixedly positioned tripod or other framework.

A selector 28 associated with the phantom circuit at the observer's station A selectively causes the illumination of indicating lamps 29, 30 and 31 to notify the observer regarding the station or pair of stations selected. This selector 28 may be of a type similar to that employed for selectors 6, 7, 8 and 9 arranged to be mechanically retained in each of a plurality of positions, and the type disclosed in my Patent No. 1,343,256 dated June 15, 1920, adjusted to be individually retained in a plurality of positions is preferable. Switching relay 32 is also controlled by the selector 28 to selectively control the association of the receivers of binaural observation sets X and Y with pairs of conductors extending to the selected detectors. Switch 48 at the observer's station controls the impression of reversed current impulses upon the phantom circuit for the selection of the pairs of detectors subsequent to the selection of the station or stations and, through the medium of relay 33, controls the supply of current to the operating circuits of the selected detectors.

The binaural observer's set X comprises earpieces 34 and 35 to which sounds generated by receivers 36 and 37, in response to current variations produced by detectors associated therewith, are conveyed through adjustable-length air tube 40 interposed between fixed-length tubes 39 and 43 respectively. The relative effective lengths of air tubes 40 and 41 may be adjustably varied by the shifting of a movable stop member 46 in response to the rotation of handwheel 44, the position of such stop member being indicated by the pointer 45. Binaural observation set Y corresponds with set X except for an increase in the total length of the adjustable-length air tubes which is necessary to agree with the increase in spacing between detectors at separate stations as compared with detectors at the same station.

It is thought that the invention may be more readily comprehended from the following description of the operation of the system shown on the annexed drawings.

Assuming that it is desired to binaurally observe the response of detectors 16 and 18 at station B, the observer operates the sending device 1 for such station which is one of the several multiply connected sending devices adapted for selecting particular stations or pairs of stations. The engagement of spring 65 with wheel 66, responsive to the first movement of the sending device 1, causes the operation of relay 68 over a circuit extending from battery, through the winding of relay 68, the normal contact of relay 69, the wheel 66 and the spring 65 of the sending device 1, segment 49, and switch arm 47 of switch 48, to ground. The closure of the alternate contact of relay 68 bridges the winding of selector 28 in series with condenser 163 across the phantom circuit while the opening of the normal contact thereof disconnects the source of current from the switch arm 71 of such selector. Each tooth of the sending device 1 engaging the spring 65 closes contact 67, thereby operating reversing relay 3 over a circuit extending from battery, through the winding of relay 3, contact 67 of sending device 1 and segment 49 and switch-arm 47 of switch 48 to ground. The succeeding opening of contact 67 when the spring 65 leaves the tooth of the sending device 1 releases relay 3. Therefore, current impulses of alternating polarity are transmitted over the phantom circuit, selectors 6, 7, 8, 9 and 28 each being advanced one step in response to each of such impulses.

Selector 6 being adjusted to be individually responsive to the series of impulses transmitted by the sender 1, such selector will be retained mechanically in its advanced position with its contact arm 72 within one step of contact 73 upon the cessation of the series, while the other selectors at stations B and C will not be advanced to the predetermined position. This can, it is thought, be more clearly understood from a brief description of the selector mechanism shown in Fig. 3.

In this figure 175 and 176 designate the windings of an electromagnet controlling a centrally pivoted armature 177, which is adapted to be polarized by a permanent magnet (not shown). Attached to the armature 177 is an elongated arm 178 carrying at its free end a pin 179 and at a point intermediate its ends a pin 180. Both of these pins are arranged to engage a pivoted lever 181 carrying at its upper end a stepping pawl 182. The electromagnet together with the lever 181 are carried by a suitable support (not shown). There is also secured to this support a ratchet wheel 183 which is mounted in close proximity to the stepping pawl 182, which is adapted, when actuated, to move into engagement with the ratchet wheel. By means of a spring 184 the ratchet wheel 183 is retained in its normal position. The stepping pawl 182 is normally held against a stop pin 185 by the action of a spring 186 attached at one end to the pawl 182 and at the other to the pivoted member 181. The pins 179 and 180 engage the pivoted lever 181 upon opposite sides of the pivoted axis and upon opposite faces in such a manner that with each movement of the armature 177 in either direction, the stepping pawl 182 will cause a one step movement of the ratchet wheel 183.

Upon the shaft carrying the ratchet wheel 183 and movable therewith is a contact carrying arm 187, the free end of which is adapted to make contact with contact springs 188, 189, and 190. This contact arm 187 corresponds to the one shown in conjunction with the selectors 6, 7, 8, 9, and 28. Carried by the ratchet wheel 183 is a holding member 191 which has one end formed in the shape of a hook and is adapted to cooperate with a holding spring 192. This holding spring is so bent or bowed that in the neutral position of the armature 177, the free end of said holding spring, which is provided with a bent projection, is in the path of the member 191.

When the armature 177 moves in response to current impulses to the winding 175—176 of the electromagnet, the lever 181 causes the engagement of the stepping pawl 182 with the ratchet wheel 183. The ratchet wheel 183 is thereupon moved by current impulses through the magnet windings to a position which, in this particular case, is within one step of contact 188, where the holding spring 192 engages the member 191. Thus if the current impulses are no longer transmitted, the ratchet wheel 183 will be retained in its advanced position by the holding spring 192.

From the above description it is at once seen that the selectors are adapted to be advanced to a predetermined point due to the transmission of alternating current impulses, where they are adapted to be mechanically held in their actuated position.

It is thus possible, as is more fully described in the description which is to follow, that the selectors may be advanced from the mechanically held position by direct current impulses for effecting the engagement of contact arm 187 with contact springs 188, 189, and 190 respectively. The selector, after being advanced from its mechanically held position by direct current impulses, is adapted to be magnetically held in such position. However, if the holding current is disconnected and thereby ceases to traverse the winding of the electromagnet of the selector, the selector will be restored to its mechanically held position from which position it can again be advanced.

In order to restore the selector to normal it is necessary to advance the selector to a point where the holding spring 192 is no longer in engagement with the member 191. When this is done the holding spring 192 falls out of the path of the member 191 and permits the selector to be restored to normal under the action of the spring 184.

The selector 28 also responding to each impulse, advances in response to the series until the switch-arm 71 thereof rests upon contact 88, in which position the selector is mechanically retained.

Due to the disengagement of spring 65 from the wheel 66, upon the completion of the series of impulses, relay 68 is released and by the opening of its alternate contact removes the winding of selector 28 from its bridged relation to the phantom circuit while the closure of its normal contact causes the lighting of lamp 29 over a circuit extending from battery, through the upper contact of relay 68, switch-arm 71 in engagement with contact 88, and the lamp 29 to ground, thereby indicating that station B has been selected.

The switch-arm 47 is then rotated in a clockwise direction and upon its engagement with segment 50, establishes an operating circuit for relay 69 from battery, through the winding of relay 69, the segment 50, and the switch-arm 47 of switch 48 to ground. The opening of the normal contact of relay 69 introduces another break in the circuit of relay 68 to prevent its false operation during further selection, while the closure of the alternate contact of such relay connects in shunt of condenser 70 a resistance 174, thereby transmitting one additional impulse over the phantom circuit. Selector 6 is thereupon advanced one step causing its switch-arm 72 to engage contact 73 and thereby bridge relay 12 across the phantom circuit. The connecting of resistance 174 in shunt of condenser 70 in this manner converts the normally non continuous or inductive phantom circuit into a conductive phantom circuit suitable for the transmission thereover of direct current which causes the operation of relay 12. The closure of contacts 105 and 106 of relay 12 bridges detector 18 across conductors 4 and 5, while the closure of contacts 103 and 104 of such relay bridges detector 16 across conductors 172 and 173. The subsequent engagement of switch-arm 47 with segment 62 operates relay 33 over a circuit established from battery, through the winding of relay 33, and segment 62 and arm 47 of switch 48 to ground. The closure of contact 162 of relay 33 completes an operating circuit for detector 16 from battery, through conductor 173, contact 103 of relay 12, the current-varying device of detector 16, contact 104 of relay 12, conductor 172, contact 162 of relay 33 and retardation coil 132 to the other side of battery. The closure of contact 161 of relay 33 establishes a similar operating circuit for detector 18 extending from battery, through conductor 4, contact 106 of relay 12, the current-varying device of detector 18, contact 105 of relay 12, the conductor 5, contact 161 of relay 33 and retardation coil 131 to the other side of battery. Contact 162 of relay 33 is shunted by condenser 94 while contact 161 of such relay is shunted by condenser 93 to provide capacitance to absorb the surges of current due to the opening and closing of the circuit.

The current-varying device operated by the vibrations of detector 16 causes current variations to be transmitted over conductor 173, through condenser 91, contact 164 of relay 32, the winding of receiver 37 and returning over conductor 172, while the current variations, due to the vibration of detector 18, are transmitted over conductor 5, through condenser 92, contact 167 of relay 32, the winding of receiver 36 and returning over conductor 4. The sounds produced in the receiver 36, in response to such variations, are transmitted through fixed length air tube 38, the adjustable length air tube 40, and the fixed length air tube 42 to ear piece 34, while the sounds produced in receiver 37 are transmitted through fixed length air tube 39, adjustable length air tube 41, and fixed length air tube 43 to ear piece 35.

The observer then rotates the hand-wheel 44 causing variations in the relative lengths of the adjustable length air tubes 40 and 41 by the shifting of movable stop 46 until the sensation is received by the observer when binaurally listening to the sounds emitted from ear pieces 34 and 35 that the source of sound is straight ahead. The position of the pointer 45 relative to its associated scale indicates the angular relation existing between the source of vibration and the base line joining the detectors 16 and 18.

After such binaural balance has been obtained, the switch-arm 47 is advanced until segment 63 is engaged thereby. As arm 47 disengages segment 62, relay 33 is released to disconnect the battery from the pairs of conductors 4—5 and 172 and 173, respectively, and the engagement of segment 60 operates reversing relay 3 over a circuit extending from battery, through the winding of relay 3, and segment 60 and arm 47 of switch 48 to ground, to send a single current impulse of reversed polarity over the phantom circuit for causing a one-step advancement of selector 6 and a consequent disengagement of switch-arm 72 and contact 73. Relay 12 is thereby released for disconnecting detectors 16 and 18 from the pairs of conductors 4—5 and 172 and 173, respectively. However, the contacts of all selectors are spaced so as to require a two-step advancement of the selector between the disengagement of one contact and the engagement of the succeeding contact. This interval is of advantage in permitting the various relays and other apparatus to function properly. The switch-arm 47 subsequently disengaging segment 60 releases relay 3, thereby transmitting another impulse of current of reversed polarity over the phantom circuit and a consequent one-step advancement of selector 6 in which position switch-arm 72 engages contact 74. Relay 11 being bridged across the phantom circuit, operates due to the direct current flowing thereover. The closure of contacts 101 and 102 of relay 11 bridges detector 18 across the conductors 4 and 5, while the closure of contacts 99 and 100 bridges detector 17 across conductors 172 and 173, respectively.

Upon the engagement of segment 63 by the switch-arm 47 relay 33 operates over a circuit established from battery, through the winding of relay 33, segment 63, and the arm 47 of switch 48 to supply battery to the detectors 17 and 18 as previously described for detectors 16 and 18, except that the circuits include the contacts of relay 11 instead of relay 12.

As in the previous case the sounds produced in the receivers 36 and 37 responsive to the vibrations of detectors 18 and 17 respectively, may be observed and the binaural balance obtained through the agency of observation set X. After the corresponding scale-reading obtained in this case has been observed, the switch-arm 47 is advanced to engage segment 64. As the arm 47 disengages segment 63, relay 33 is again released to remove the source of current from the operating circuits of the connected detectors as before, and when the arm engages segment 61, relay 3 is again operated over a circuit extending from battery, through the winding of relay 3, and segment 61 and arm 47 of switch 48 to ground. Selector 6 in its one-step advancement, in response to the single impulse of current thereby transmitted over the phantom circuit, causes arm 72 to disengage contact 74, releasing relay 11 for disconnecting detectors 17 and 18 from conductors 4—5 and 172—173. Upon the subsequent disengagement of arm 47 from segment 61, relay 3 is released to transmit another impulse of current of reversed polarity over the phantom circuit. Selector 6 in making the one-step advancement in response thereto, causes switch-arm 72 to engage contact 75, and relay 10 becoming bridged across the phantom circuit operates due to the direct current flowing over such circuit. The closure of contacts 97 and 98 of relay 10 bridges detector 17 across conductors 4 and 5, while the closure of contacts 95 and 96 of such relay bridges detector 16 across the conductors 172 and 173. The engagement of arm 47 with segment 64 operates relay 33 over a circuit established from battery through the winding of relay 33 and segment 64 and arm 47 of switch 3 to ground, completing operating circuits for detectors 16 and 17 similar to those previously traced for detectors 16 and 18 except for the substitution of the contacts of relay 10 for those of relay 12. As before, the sounds produced in receivers 36 and 37 in response to the vibrations of detectors 17 and 16 respectively, may be observed and the binaural balance obtained by means of the set X.

After the corresponding scale-reading indicating the angular relation of the source of vibration to the base line joining detectors 16 and 17 has been obtained, the arm 47 is advanced to its normal position in contact with segment 49. As the arm disengages segment 64, relay 33 again releases to remove the battery supply from conductors 4—5 and 172—173. When arm 47 disengages segment 50, relay 69 releases, thereby removing the shunt-circuit previously established for condenser 70 and reconnecting the winding of relay 68 with the wheels 66 of the sending devices. Selector 6 is thereupon restored to its selected mechanically held position with the arm 72 within one step of contact 73 since the direct current path for such selector is disabled by the removal of the shunt-circuit around condenser 70. Therefore, if it is desired to reobserve the operation of the detectors at station B, the arm 47 is given another clockwise rotation with the result as previously described.

However, in case it is next desired to subject the detectors at station C to observation, a sender 171 similar to that shown at 1 but adapted to transmit a series of impulses which will release any selectors having been previously operated, is then actuated, relay 68 operating to reconnect the selector 28 with the phantom circuit, and as previously described, reversed current impulses are transmitted over the phantom circuit. In response to this series, selectors 6 and 28 advance step by step until the mechanism for retaining them is disabled and they are restored to normal. The other selectors are also advanced step by step but are restored to normal upon the cessation of the impulses. Relay 68 is released upon the cessation of the impulses to remove the selector 28 from its relation to the phantom circuit.

A sender 2 similar to 1 but adapted for selecting station C is then actuated, relay 68 operating to reassociate the selector 28 with the phantom circuit. This series of impulses causes selector 8 to advance until its arm 80 is within one step of contact 81, in which position such selector is individually retained by mechanical means as previously described in connection with Fig. 3, while selectors 6, 7 and 9 are restored to normal. Selector 28 also advances in a manner similar to that described in connection with the selection of station B to a mechanically held position, wherein arm 71 is in engagement with contact 89. Due to the subsequent release of relay 68, selector 28 is removed from its association with the phantom circuit and lamp 30 is lighted to indicate the selection of station C. As previously described, arm 47 of switch 48 is given a clockwise rotation and its engagement with segment 50 operates relay 69 to connect the resistance 174 in shunt of the condenser 70 to transmit a single impulse over the phantom circuit, advancing selector 8 until arm 80 engages contact 81, thereby placing the winding of relay 15 across the phantom circuit. Such relay operates due to the direct current flowing over the phantom circuit, and in closing contacts 121 and 122, bridges detector 19 across conductors 4 and 5, while the closure of contacts 123 and 124 bridges detector 21 across conductors 172 and 173 respectively. The subsequent engagement of arm 47 with segment 62 causes the operation of relay 33 to supply battery to the current-varying devices of detectors 19 and 21, as previously described in connection with the detectors at station B. The detectors 19 and 21 are then subjected to binaural observation by means of set X, as described for the other detectors, and after the position of pointer 45, indicating the angular relation of the source of vibration to a base line joining detectors 19 and 21, is observed, arm 47 is advanced to engage segment 63. Relay 33 releases upon the disengagement of arm 47 from segment 62, thereby removing current supply from the conductors 4—5 and 172 and 173 respectively, while the subsequent engagement and disengagement of arm 47 and segment 60, as before, transmits two reversed current impulses over the phantom circuit advancing arm 80 of selector 8 to engage contact 82. Relay 15 is released upon the disengagement of arm 80 from contact 81, while relay 14 being bridged across the phantom circuit when arm 80 engages contact 82 operates upon the direct current flowing over such circuit. The closure of contacts 119 and 120 of relay 14 bridges detector 21 across conductors 172 and 173 respectively, while the closure of contact 117 and 118 thereof bridges detector 20 across conductors 4 and 5. As before, the subsequent engagement of arm 47 and segment 63 reoperates relay 33 to supply current to the current-varying devices of detectors 20 and 21. The operation of such detectors having been observed by set X in a manner similar to that described, arm 47 is advanced to engage segment 64. As before, when arm 47 leaves segment 63, relay 33 releases removing current supply from the observed detectors, and as the arm engages and disengages segment 61 two reversed current impulses are impressed upon the phantom circuit causing a two-step advancement of selector 8, the arm 80 of which advances to engage contact 83. Relay 14 releases when arm 80 leaves contact 82, thereby disconnecting detectors 20 and 21 from conductors 172 and 173 respectively and 4—5 respectively, and relay 13 operates due to direct current flowing over the phantom circuit when arm 80 engages contact 83. The closure of contacts 113 and 114 of relay 13 bridges detector 19 across conductors 4 and 5, while the closure of contacts 115 and 116 of such relay bridges detector 20 across conductors 172 and 173 respectively. As in the previous instances, relay 33 operates upon the engagement of arm 47 and segment 64 to supply battery to the selected detectors. After these detectors have been subjected to binaural observation through set X in a manner similar to that previously described, the arm 47 is returned to its normal position in engagement with segment 49, thus releasing relay 33 and subsequently releasing selector 8 by releasing relay 69 for disabling the direct current path over the phantom circuit. Selector 8 thereupon returns to its mechanically retained position in which arm 80 is within one step of contact 81. Relay 13 also releases to disconnect detectors 19 and 20 from the pairs 4—5 and 172 and 173 respectively. As before, the observer then actuates the releasing sender 171 to transmit a series of impulses over the phantom circuit to cause the release of selectors 8 and 28 and restores all apparatus to normal.

The observer thereupon actuates sender 170 which is adapted to impress a series of impulses upon the phantom circuit to enable the observer to pair the detectors at station B with those at station C. As in the other cases, relay 68 operates to connect master selector 28 across the phantom circuit. However, the characteristic series of reversed current impulses simultaneously advances selectors 7 and 9 to mechanically retained positions in which their arms 76 and 84 are maintained within one step of the associated contacts 77 and 85 respectively. Selectors 6 and 8 also advance in response to the impulses but not being adjusted for this series of impulses return to normal upon the cessation of the series. However, master selector 28 is advanced and is mechanically retained with its arm 71 engaging contact 90. Lamp 31 is lighted over an obvious circuit to indicate that stations B and C have been simultaneously selected and relay 32 is operated over a circuit established from battery, through the normal contact of relay 68, the arm 71 of selector 28 in engagement with contact 90, and the winding of relay 32 to ground. The opening of contacts 164 and 167 of relay 32 removes receivers 36 and 37 from their normal association with conductors 4—5 and 172—173 respectively, and the closure of contacts 165 and 166 of such relay associates receivers 136 and 137 with such conductor pairs.

Arm 47 of switch 48 is thereupon rotated in a clockwise direction until it engages segment 62. As previously described, the engagement of arm 47 with segment 50 operates relay 69 to thereby connect the resistance 174 in shunt of condenser 70, sending one impulse of current over the phantom circuit and establishing a direct current path over the phantom circuit. Selectors 7 and 9 simultaneously advance one step in response thereto causing arms 76 and 84 to engage contacts 77 and 85 respectively. Relays 24 and 27 being thereby bridged across the phantom circuit are operated by the direct current in such circuit, the closure of contacts 111 and 112 of relay 24 bridging detector 18 at station B across conductors 172 and 173 and the closure of contacts 129 and 130 of relay 27 bridging detector 21 at station C across conductors 4 and 5. The subsequent engagement of arm 47 and segment 62 operates relay 33 to supply current to the selected detectors.

The angular relation of the source of sound to a base line joining detectors 18 and 21 is then obtained in a manner similar to that previously described when the detectors were located at the same station, except that binaural set Y is employed under these conditions, the current variations produced by detector 18 flowing from conductor 173, through condenser 91, contact 165 of relay 32, and the winding of receiver 137 to conductor 172, while the current variations produced by detector 21 flow from conductor 5, through condenser 92, contact 166 of relay 32 and winding of receiver 136 to conductor 4. The sounds produced in receiver 136 in response thereto are conveyed to ear piece 134, through serially interconnected air tubes 138, 140 and 142, while those produced in receiver 137 are conveyed to ear piece 135, through serially connected air tubes 139, 141 and 143. The movable stop member 146 is then adjusted through the agency of handwheel 144 until the observer, listening binaurally to sounds emitted from the ear pieces 134 and 135, receives the sensation that the source of sound is straight ahead. The position then occupied by the pointer 145 indicates the angular relation of the observed source to a base line joining detectors 18 and 21.

The arm 47 is then moved to engage segment 63, the disengagement of segment 62 causing the release of relay 33 to remove the current supply from the conductors 4—5 and 172 and 173 respectively and the subsequent engagement and disengagement of arm 47 and the segment 60 impressing two reversed current impulses upon the phantom circuit, the first of which causes selectors 7 and 9 to move arms 76 and 84 out of engagement with contacts 77 and 85 respectively. Relays 24 and 27 consequently release to disconnect detectors 18 and 21 from conductors 172 and 173 respectively and 4—5. The second impulse causes selectors 7 and 9 to move arms 76 and 84 into engagement with contacts 78 and 86 respectively. Relays 23 and 26 being thereby bridged across the phantom circuit are operated by the direct current present in such circuit, the former relay through the closure of its contacts 109 and 110 bridging detector 17 across conductors 172 and 173 respectively and the latter relay through the closure of its contacts 127 and 128 bridging detector 20 across conductors 4 and 5. As before, relay 33 operates upon the engagement of arm 47 with segment 63 to supply battery to the selected detectors. After subjecting such detectors to binaural observation through set Y, in a manner similar to that previously described, and noting the angular relation of the source of vibration to the base line joining detectors 17 and 20, arm 47 is advanced to engage segment 64. Relay 33 releases to remove battery from conductors 4—5 and 172 and 173 respectively when arm 47 disengages segment 63 and the subsequent engagement and disengagement of arm 47 and segment 61 transmits two reversed current impulses over the phantom circuit. In response to the first of these impulses, arms 76 and 84 disengage contacts 78 and 86 respectively, releasing relays 23 and 26 to disconnect detectors 17 and 20 from conductors 172 and 173 respectively and 4—5, while in response to the second impulse, such arms engage contacts 79 and 87 respectively. Relays 22 and 25 being bridged across the phantom circuit are operated by the direct current present therein, the former by the closure of contacts 107 and 108 bridging detector 16 across conductors 172 and 173 respectively and the latter by the closure of contacts 125 and 126 bridging detector 19 across conductors 4 and 5. The subsequent engagement of arm 47 and segment 64 operates relay 33 to supply battery to the selected detectors which are then binaurally observed through the medium of set Y, as previously described.

Upon noting the angular relation of the source to the base line joining detectors 16 and 19, as indicated by the position of pointer 145, the observer returns arm 47 to engage segment 49. Relay 33 releases when arm 47 disengages segment 64, and relay 69 releases when the arm leaves segment 50. Since the direct current path over the phantom circuit is disabled by the release of relay 69, selectors 7 and 9 are returned to their mechanically retained positions. The releasing sender 171 then being actuated causes the release of selectors 7, 9 and 28 and the return of all apparatus to normal.

Although only two selectable stations are shown, it is understood that there may be, and usually are, many such stations employed in a system of this character.

It will be noted that in each instance the selectors are advanced by alternating current impulses transmitted over the phantom circuit and that no current is present in the operating circuits of the detectors until after the detectors are connected in circuit.

Since the position of the arm 47 of the switch 3 determines the pair of detectors connected to the line circuits, such arm may serve as means to positively indicate the pair under observation, the normal position thereof indicating that no pair is connected. A convenient arrangement is to associate this switch with the compensator so that the position of the arm 47 may be readily noticed by the observer.

In order that the operation of the various selectors at the selectable stations, such as 6, 8, 7 and 9 respectively may be compared with that of the selector 28 located at the receiving station, the following table has been prepared:

6—6—3
6—4—5
4—4—7

The above table gives the number of impulses required to be transmitted for causing the advancement of the selectors in the order 6, 8, 7 and 9 respectively to their mechanically held position which, as brought out in the specification, is within one step of the first contact spring associated therewith. The last set of impulses in each of the groups listed in the above table is the number required to advance the selector 28 to such a position as to close a circuit including the signal lamp corresponding with the selector selected at the selectable station. The selector 28 will, therefore, not cause the lighting of the signal lamps due to its advancement by the other impulses in the group.

What is claimed is:

1. In a switching system, a phantom circuit, normally permitting only the passage of alternating current, a selecting station and a plurality of selectable stations associated therewith, a step-by-step selector at each selectable station responsive to alternating current impulses received over the phantom circuit, means at the selecting station for transmitting alternating current impulses over the phantom circuit, means responsive to said alternating current impulses for advancing any selector into a predetermined position, means at the selecting station for adapting the circuit to permit the passage of direct current, and additional means at the selecting station for transmitting current impulses over the circuit when so adapted to operate said second mentioned means for advancing the selected selector from its predetermined position.

2. In a switching system, a phantom circuit, a condenser included therein, a selecting station and a plurality of selectable stations connected to the phantom circuit, a step-by-step selector at each selectable station responsive to alternating current impulses received over the phantom circuit and adapted to be held mechanically in a predetermined position, means at the selecting station for transmitting alternating current impulses over the phantom circuit, means responsive to said alternating current impulses for advancing any selector into a predetermined mechanically retained position, means at the selecting station for shunting the condenser, and means also at the selecting station for subsequently transmitting alternating current impulses over the phantom circuit for effecting the operation of said second-mentioned means to advance the selected selector from its predetermined position into a magnetically retained position.

3. In a switching system, a phantom circuit, normally permitting only the passage of alternating current, a selecting station and a plurality of selectable stations associated with the phantom circuit, a step-by-step selector at each selectable station responsive to alternating current impulses received over the phantom circuit, and adapted to be mechanically held in a predetermined position, a plurality of electrical devices at each selectable station, means at the selecting station for transmitting alternating current impulses over the phantom circuit, means responsive to said alternating current impulses for advancing any selector into a predetermined mechanically retained position, means also at the selecting station for converting the phantom circuit into a conductive circuit adapted to permit the passage of direct current, additional means at the selecting station for transmitting current impulses over the conductive phantom circuit to effect the operation of said second-mentioned means for advancing the selected selector from the predetermined position, said selected selector being retained in its further advanced position under control of the last-mentioned means, and means controlled by the selector in its further advanced position to selectively associate the electrical devices thereat with the side circuits comprising the phantom circuit.

4. In a switching system, a pair of line circuits, a receiving and a plurality of selectable stations associated therewith, transmitting means at each of the selectable stations, switching means at the receiving station, selecting means at each of the selectable stations controlled by said switching means for associating said transmitting means with the line circuits in one relation, additional means at the selectable stations also controlled by said switching means for associating said transmitting means with the line circuit in another relation, a plurality of receiving means at the receiving station adapted for use with the transmitting means in each relation, and selecting means controlled by the switching means for automatically associating with the line circuits the receiving means adapted for use with the selecting relation of the transmitting means.

5. In a switching system, a phantom circuit, a selecting and a plurality of selectable stations associated therewith, a source of current for association with each side circuit comprising the phantom circuit, a plurality of receiving means at the selecting station for association with the side circuits, a plurality of transmitting means at each selectable station for association with the side circuits, a plurality of step-by-step selectors at each selectable station responsive to current impulses received over the phantom circuit, means at the selecting station for transmitting current impulses over the phantom circuit for advancing any selector into a predetermined position, means operated by the individual advancement of one selector in response to such current impulses to its predetermined position to selectively associate a pair of the associated transmitting means with the side circuits, and means operated by the simultaneous advance of such selectors to their predetermined positions to each associate one of the associated transmitting means with one side circuit, the transmitting means at the two stations being associated with different side circuits, and means for selectively associating the receiving means with the side circuits.

6. In a switching system, a phantom circuit, a selecting station and a pair of selectable stations associated therewith, a source of current associated with each side of the phantom circuit, a plurality of pairs of receiving means at the selecting station for association with the side circuits of the phantom circuit, a pair of transmitting means at each selectable station, a pair of step-by-step selectors at each selectable station responsive to current impulses received over the phantom circuit, a step-by-step selector at the selecting station also responsive to such current impulses, control means at the selecting station for transmitting current impulses over the phantom circuit to individually advance one of the selectors at either station into a predetermined position, additional control means at the selecting station for transmitting current impulses over the phantom circuit to advance both of the other selectors at the selectable stations into their predetermined positions, switching means controlled by the first-mentioned selector for associating the associated pair of transmitting means with the side circuits, simultaneously operating switching means at each selectable station controlled by the other selector thereat in its predetermined position to associate one of the transmitting means thereat with one side circuit, the two transmitting means being associated with different side circuits, and means controlled by the selector at the selecting station to selectively associate a pair of receiving means with the side circuits.

7. In a signaling system, a signaling circuit, a receiving station, a plurality of groups of signal transmitters, a plurality of groups of signal receivers at the receiving station, means controlled by code impulses impressed upon the circuit to selectively associate the groups of transmitters with the circuit, and means at the receiving station also responsive to the code impulses to control the association of the groups of receivers with the circuit.

8. In a signaling system, a signaling circuit, a receiving station, a plurality of groups of signal transmitters, the transmitters within the different groups being differently interrelated, a group of signal receivers at the receiving station for each of the groups of signal transmitters, means controlled by code impulses impressed upon the circuit to selectively associate the groups of the transmitters with the circuit, and means at the receiving station also responsive to the code impulses to control the association of the groups of receivers with the circuit as determined by the relation of the transmitters within the selected group.

9. In a switching system, a plurality of circuits interconnecting a plurality of selectable stations, selectors and selectable devices at each station, means for operating said selectors to select a device over one of said circuits and means operative for transmitting over another of the circuits a series of impulses to selectively set a selector to prepare it for subsequent operation by said operating means.

10. In a switching system, a line circuit interconnecting a central station and a plurality of substations, a plurality of selectable devices at each substation, selecting devices at said central station and said substations and controlled at said central station for selecting said devices in pairs, and an additional selecting device at each substation controlled from said central station for selecting each of said selectable devices individually, whereby a plurality of devices at two or more substations may be selected simultaneously.

11. In a switching system, a line circuit interconnecting a central station and a plurality of substations, a plurality of selectable devices at each substation, selecting means controlled at said central station for selecting said devices in pairs, and additional selecting means controlled at said central station for selecting each of said devices individually.

12. In a switching system, a line circuit interconnecting a central station and a plurality of substations, a plurality of selectable devices at each substation, means controlled at said central station for selecting a pair of said devices at any substation, and additional means controlled at said central station for simultaneously selecting any one of said devices at each of two substations.

13. In a switching system, a line circuit interconnecting a central station and a plurality of substations, a plurality of selectable devices at each substation, selecting means controlled at said central station for associating said devices in pairs with said line circuit, and additional selecting means controlled at said central station for associating each of said devices individually with said line circuit.

14. In a switching system, a line circuit interconnecting a central station and a plurality of substations, a plurality of selectable devices at each substation, means controlled at said central station for associating a pair of said devices at any substation with said line circuit, and additional means controlled at said central station for simultaneously associating any one of said devices at each of two substations with said line circuit.

15. In a switching system, a phantom circuit interconnecting a central station and a plurality of substations, a plurality of selectable devices at each substation, means controlled at said central station for associating said devices in pairs with the side circuits of the phantom circuit, and additional means controlled at said central station for associating each of said devices individually with the side circuits of the phantom circuit.

16. In a switching system, a phantom circuit interconnecting a central station and a plurality of substations, a plurality of selectable devices at each substation, means controlled at said central station for associating a pair of said devices at any station with one side circuit of the phantom circuit, and additional means controlled at said central station for simultaneously associating any one of said devices at each of two substations with one side circuit of the phantom circuit, the two devices being associated with different side circuits.

17. In a switching system, a line circuit, a plurality of electrical devices, switching means for connecting said devices to the line circuit individually and in pairs, a source of current for connection to the line circuit, and means cooperating with the switching means for limiting the connection of the source to the line circuit and its disconnection therefrom to periods when the device or devices are connected thereto.

18. In a switching system, a line circuit, a plurality of electrical devices for connection therewith, switching means for connecting said devices to the line circuit individually or in pairs, a source of current for connection to the line circuit, and means cooperating with and controlled by the switching means for connecting the source with the line circuit subsequent to the connection of the device or devices thereto, and for disconnecting the source from the line circuit prior to the disconnection of the device or devices therefrom.

19. In a switching system, a phantom circuit, a plurality of electrical devices, means for selectively connecting said devices individually to opposite side circuits of said phantom circuit, a source of current adapted to be connected to said side circuits, and means cooperating with said first mentioned means for connecting said source of current to said side circuits only during the period when one of said electrical devices is connected thereto.

20. In a switching system, a phantom circuit, a plurality of electrical devices, switching means for connecting said devices in pairs to one side circuit of said phantom circuit, a source of current for connection to said side circuit, and means cooperating with said switching means for connecting said source of current to said circuit only during the periods when said electrical devices are connected thereto.

21. In a switching system, a line circuit, an electrical device, step-by-step means for connecting the device to the line circuit, a source of current for connection to the line circuit, and means cooperating with the switching means for limiting the connection of the source to the line circuit and its disconnection therefrom to periods when the device is connected thereto.

22. In a switching system, a line circuit interconnecting a selecting and a plurality of selectable stations, a plurality of electrical devices at each of said selectable stations, switching means for connecting said devices to said line circuit, a source of current adapted to be connected to said line circuit, and means cooperating with said switching means for connecting said source of current to said line circuit only during the periods when said electrical devices are connected to said line circuit.

23. In a switching system, a line circuit normally permitting only the passage of alternating current, a selecting station and a plurality of selectable stations associated therewith, means at the selecting station for transmitting alternate current impulses over the line circuit, means at each selectable station responsive to alternating current impulses received over the line circuit, means at the selecting station for adapting the circuit to permit the passage of direct current, and additional means at the selecting station for transmitting direct current impulses over the circuit when so adapted to operate the said means located at the selectable station.

In witness whereof, I hereunto subscribe my name this 24th day of June A. D., 1919.

JOSEPH C. FIELD.